United States Patent Office 3,417,953
Patented Dec. 24, 1968

3,417,953
MECHANICAL SUPPORT ASSEMBLIES
Warren K. Hillquist, Boston, and Paul A. Hillquist, Cambridge, Mass., assignors to Instrumentation Laboratory, Inc., Watertown, Mass., a corporation of Massachusetts
Filed Oct. 31, 1966, Ser. No. 590,690
4 Claims. (Cl. 248—280)

ABSTRACT OF THE DISCLOSURE

An adjustable mechanical support assembly for stably positioning a tubular electrode in a wide range of positions includes four metal straps, each of which has a 0.125 inch O.D. transverse pin press fitted in each end. The assembly also includes a base, an electrode receptacle and a joint, each of which is of plastic and includes two pairs of spaced ears. Each ear has an 0.116 inch diameter aperture and a radial slot and the pins extend through the apertures to define friction joints. Equipoising springs are connected between the pins secured to the plastic components.

---

This invention relates to mechanical support assemblies and more particularly to a mechanical support assembly of the equipoising type and to pivot constructions useful in such assemblies.

It is frequently desirable to provide a mechanical support assembly which will allow the ready positioning of an implement or other similar device in an infinite variety of positions within a given space. In such devices, the implement to be positioned should be easily moved to desired position but once in that position the mechanical support assembly should be arranged so that the implement so positioned will remain in the desired location. It is an object of this invention to provide a novel and improved mechanical support assembly. Support assemblies of this type frequently require complex bearing assemblies engineered to the precisely required degree of friction. It is another object of this invention to provide a pivot assembly of simplified and economical construction which reliably provides a proper degree of friction, which degree of friction is maintained over substantial life of the support assembly. Still another object of the invention is to provide an equipoising mechanical support assembly employing a pivot construction of simplified and economical configuration.

In accordance with the invention a mechanical support assembly is provided which includes two pairs of rigid arms which couple a base structure to an implement holder or other suitable load. Each pair of arms are maintained in parallel relation by coupling structures, a first coupling structure connecting the first ends of the first pair of arms to the base, a second coupling structure connecting the first ends of the second pair of arms to the holder, and a third coupling structure connecting the other ends of the two pairs of arms together. Each arm has a stub shaft structure at each end including shaft portions fixed against rotation relative to the arm and which project in opposite directions so that two parallel spaced axes are defined. Each coupling structure includes a pair of spaced ears, each ear having a circular aperture therein, and the two apertures being aligned so that an axis is defined. Each ear has a slot which extends outwardly from the aperture entirely through the ear portion. The shaft portion of an arm is disposed between the spaced ears. Each stub shaft portion is of a larger diameter than the aperture in the coupling member so that when the stub shaft portion is inserted in the aperture the material of the coupling member is stressed as allowed by the radially extending slots in the coupling member and forms a frictional joint. Each pair of stub shafts is thus rigidly secured to the coupling member so that the arm is rotatable about an axis defined by the apertures of the coupling member. Equipoising springs are connected between the three coupling structures.

This mechanical support structure provides a sturdy, versatile assembly which enables a load to be positioned in a multiplicity of positions merely by manual movement of the support linkage. The pivot units provide sufficient friction to hold the load where it is located while permitting ready movement to a different position. The stressed material of the coupling structure provides a unit of uniform frictional characteristics and of long life.

Other objects, features, and advantages of the invention will be seen as the following description of a particular embodiment progresses in conjunction with the drawings in which.

Figure 1:
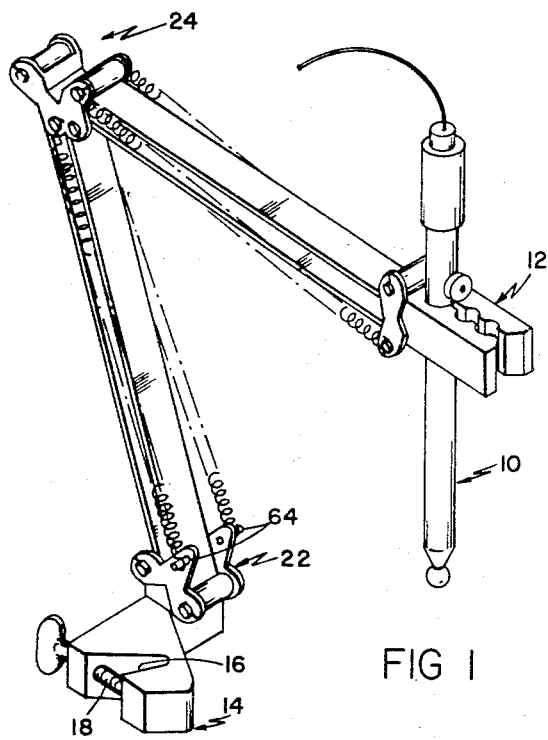
FIG. 1 is a perspective view of a mechanical support assembly constructed in accordance with the invention.

With reference to FIG. 1 there is shown a mechanical support assembly for supporting an electrode 10 in stable vertical position as supported by holder 12 relative to a base element 14 which is provided with a notch 16 and set screw 18 by means of which the support assembly may be secured to a suitable supporting structure.

Figure 2:
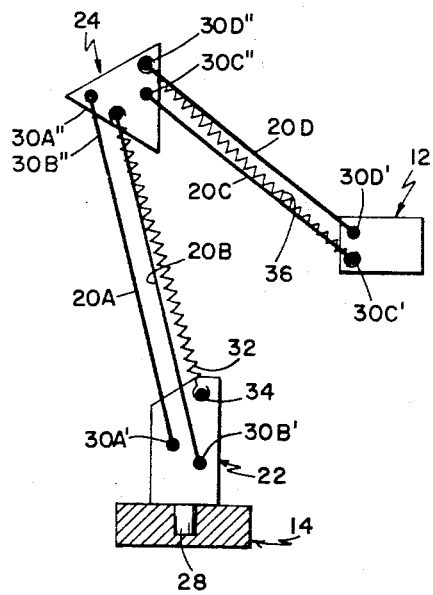
FIG. 2 is a diagrammatic side view of the structure shown in FIG. 1.

This support assembly, as indicated in FIG. 2, includes the holder 12, a base 14, two pairs of arms 20A, 20B, and 20C, 20D, respectively; a base coupling element 22 and an intermediate coupling element 24. Base coupling element defines a pivot axis 30A' for one end of arm 20A and a second pivot axis 30B' for one end of arm 20B. Similarly, holder 12 defines a pivot axis 30C' for arm 20C and a pivot axis 30D' for arm 20D. Intermediate coupling element 24 defines pivot axes 30A", 30B", 30C", and 30D" in similar manner.

Arms 20A and 20B are of equal length as are arms 20C and 20D. Thus with the mechanism as indicated in FIG. 2, the plane through axes 30C' and 30D' is parallel to the axis of rotation of coupling member 22 which is mounted on stub shaft 28 normally for rotation about a vertical axis relative to the base 14; as the two pairs of parallelogram linkages are moved to displace the holder the plane defined by axes 30C' and 30D' remains vertical so that the electrode or other suitable device supported in holder 12 is maintained in vertical position while the mechanical support structure enables it to be positioned at a wide variety of locations surrounding the pivot axis defined by shaft 28.

A first pair of equipoising springs 32 are connected from a projection 34 on base coupling 22 to a projection on axis 30A"; while a second pair of equipoising springs 36 are connected between axes 30C' and 30D".

Figure 4:
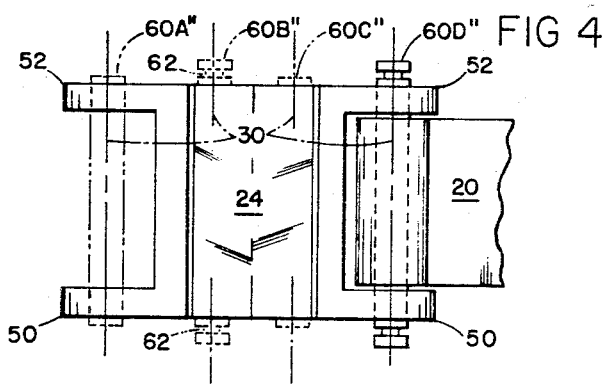
FIG. 4 is a top plan view of one of the coupling structures employed in the embodiment shown in FIG. 1 with a mechanical arm secured to one of the pairs of ears of the coupling structure.
Figure 3:
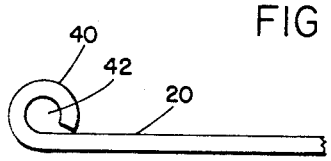
FIG. 3 is a detail of the portion of one of the support arms employed in the support structure shown in FIG. 1.
Figure 5:
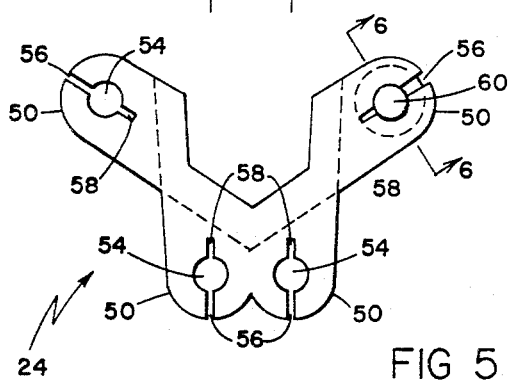
FIG. 5 is a side view of the structure shown in FIG. 4.

Each arm 20 is manufactured of flat steel stock and, as indicated in FIG. 3, each end 40 of each arm is rolled over to form a cylindrical passage 42 which in this embodiment has a diameter of 0.122 inch. Each structure is manufactured of resilient material. A suitable plastic material is ethyl cellulose manufactured under the trade name Celcon. Each pivot axis 30 of each coupling structure is defined by two projecting ears 50, 52. Thus shown in FIGS. 2 and 4 coupling member 24 has four pairs of ears 50, 52. The space between the ears 50, 52 is sufficient to receive the width of arm 20 for free pivoting movement. Each ear has an aperture 54 formed in it which is initially formed to have a diameter of 0.116 inch. In addition, each ear has a slot 56 that extends radially outwardly entirely through the wall of the ear and a second slot 58 which extends radially inwardly towards the body of the coupling member in alignment with slot 56. The apertures 54 define the pivot axis 30.

Received in each pair of apertures extending between the ears 50 and 52 is two opposed stub shaft portions in the form of a pin 60 which is of 0.125 inch in diameter. When this pin is positioned in an aperture 54, the aperture is distorted as permitted by slots 56 and 58 so that the pin is received in wiping engagement providing a joint which is subjected to frictional force which is maintained under the influence of the distorted material.

In assembling an arm 20 to a coupling member, the end 40 of the arm is positioned so that its passage 42 is aligned with the corresponding pair of apertures 54 in the pair of ears of a coupling member to which the arm end is to be secured. A pin 60 is then pressed through the apertures 54 and 42 securing the arm end to the coupling member. By appropriate selection of the initial dimensions of the apertures and the diameter of the pin, the pin is firmly secured to the arm 20 so that there is no relative rotation between link 20 and pin 60. However, the resilient coupling member material distorts sufficiently so that a joint of frictional characteristics sufficient to maintain the structure mechanical linkage assembly in position but permitting it to be easily moved or adjusted to another position as desired in a stable manner is achieved.

Figure 6:
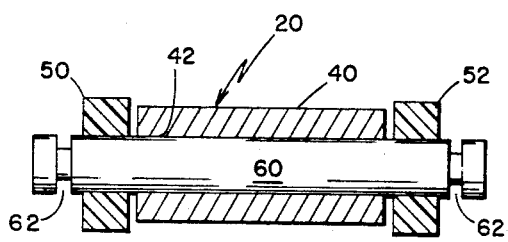
FIG. 6 is a sectional view taken along the line 6—6 of FIG. 5 showing details of the pivot construction employed in the embodiment of the invention shown in FIG. 1.

Pins 60B", 60D", and 60C' each include an annular recess 62 (as indicated in FIG. 6) at either end which projects beyond the ears 50, 52 when the pin is properly positioned in the arm and coupling member. These recesses 62 receive the ends of springs 32 and 36. Stub shafts 64 are mounted on projections 34 to receive the other ends of springs 32 such that they are offset relative to pivot axis 30B'.

The invention provides a convenient and sturdy holder structure for supporting equipment in a stable position and yet easily moved as desired relative to base 14.

While a particular embodiment of the invention has been shown and described, various modifications thereof will be obvious to those skilled in the art and therefore it is not intended that the invention be limited to the disclosed embodiment or to details thereof and departures may be made therefrom within the spirit and scope of the invention as defined in the claims.

What is claimed is:

1. A mechanical support assembly for releasably securing a sensing element in spatially stable position comprising first and second pairs of elongated rigid arm members, each said arm member having a pair of stub shaft portions projecting in opposite directions at each end of the arm, said stub shaft portions being secured against rotation relative to said arm member,
   a base component including a first coupling element connecting one end of each of said first pair of arms for rotation about a first set of fixed spaced parallel axes.
   a receptacle component for releasably receiving a sensing element, said receptacle component including a second coupling element connecting one end of each said second pair of arms for rotation about a second set of fixed spaced parallel axes, and
   a third coupling element connecting the second ends of said first and second pairs of arms for rotation about third and fourth sets of fixed spaced parallel axes,
   each said coupling element including two pairs of spaced projecting ear portions, each said pair receiving the end of an arm therebetween and each said ear portion having a circular aperture therein for receiving a stub shaft portion of said arm to define a rotary frictional joint, the apertures in said two spaced ears defining one of said axes, and
   equipoising springs connected between said first, second and third coupling elements.

2. The assembly as claimed in claim 1 wherein each said ear has a radially extending slot which permits the aperture to be distorted from its normal circular dimension in receiving a stub shaft portion of larger dimension so that a frictional bearing is provided which has sufficient friction to maintain a sensing element attached to said receptacle component in stable position while permitting said sensing element to be readily moved relative to said base component.

3. The assembly as claimed in claim 2 wherein each said arm is a flat rigid strap having a cylindrical passage of uniform diameter, extending across its width formed at each end, and a pin of larger diameter is press fitted into said passage to define said stub shaft portions so that stub shaft portions are secured against rotation relative to said arm.

4. The assembly as claimed in claim 3 wherein each said strap and pin is metal, each said coupling element is of plastic material, and said springs are secured to portions of said pins projecting beyond said ears of said coupling elements.

References Cited
UNITED STATES PATENTS

| | | | |
|---|---|---|---|
| 325,419 | 9/1885 | Langdon | 248—281 XR |
| 2,787,434 | 4/1957 | Jacobsen | 248—280 |
| 3,258,235 | 6/1966 | Mozley | 248—106 |

ROY D. FRAZIER, *Primary Examiner.*

J. F. FOSS, *Assistant Examiner.*

U.S. Cl. X.R.

248—324, 281, 284; 287—100